US012043162B1

(12) United States Patent
Taylor (10) Patent No.: US 12,043,162 B1
(45) Date of Patent: Jul. 23, 2024

(54) SYSTEM FOR TRANSPORT OF DRY BULK MATERIAL

(71) Applicant: Michael Taylor, Riddleton, TN (US)

(72) Inventor: Michael Taylor, Riddleton, TN (US)

( * ) Notice: Subject to any disclaimer, the term of this patent is extended or adjusted under 35 U.S.C. 154(b) by 0 days.

(21) Appl. No.: 18/097,741

(22) Filed: Jan. 17, 2023

(51) Int. Cl.
| *B65D 47/26* | (2006.01) |
| *B60P 1/60* | (2006.01) |
| *B60P 3/22* | (2006.01) |
| *B65G 53/06* | (2006.01) |
| *B65G 53/66* | (2006.01) |

(52) U.S. Cl.
CPC .............. *B60P 3/2245* (2013.01); *B60P 1/60* (2013.01); *B60P 3/225* (2013.01); *B65G 53/06* (2013.01); *B65G 53/66* (2013.01)

(58) Field of Classification Search
None
See application file for complete search history.

(56) References Cited

U.S. PATENT DOCUMENTS

| 1,081,350 | A | * | 12/1913 | Viney | F28F 13/12 |
| | | | | | 251/340 |
| 2,655,286 | A | * | 10/1953 | Barbaro | B67D 3/00 |
| | | | | | 222/362 |
| 3,957,176 | A | * | 5/1976 | Marston | B44D 3/14 |
| | | | | | 222/389 |
| 4,909,556 | A | * | 3/1990 | Koskinen | B65G 53/12 |
| | | | | | 296/10 |
| 5,890,627 | A | * | 4/1999 | Storey | B65D 47/265 |
| | | | | | 222/129 |
| 5,997,099 | A | * | 12/1999 | Collins | B65D 90/623 |
| | | | | | 298/23 A |
| 6,328,183 | B1 | | 12/2001 | Coleman | |
| 6,783,032 | B2 | * | 8/2004 | Fons | B65D 90/043 |
| | | | | | 222/462 |
| 7,252,309 | B2 | | 8/2007 | Eng Soon et al. | |
| 7,475,796 | B2 | * | 1/2009 | Garton | B65D 90/12 |
| | | | | | 211/183 |
| 7,500,817 | B2 | | 3/2009 | Furrer et al. | |
| 7,882,990 | B1 | * | 2/2011 | Walters | B65D 83/22 |
| | | | | | 222/402.11 |
| 8,240,494 | B1 | * | 8/2012 | Mohns | A01C 15/006 |
| | | | | | 220/636 |

(Continued)

*Primary Examiner* — Joseph A Dillon, Jr.
(74) *Attorney, Agent, or Firm* — Patterson Intellectual Property Law, P.C.; Samuel A. Raque (57) ABSTRACT

A dry bulk material transport system for the modular transport and unloading of dry bulk material, the dry bulk material transport system comprises a transport container, a storage container, and a pneumatic bulk material outflow system. The transport container comprises a transport container shell, a transport container support frame fixed to the transport container shell, a transport container outlet disposed at a bottom of the transport container shell, and a transport container outlet valve rotatable between an open position and a closed position. The storage container comprises storage container shell, a receiving frame fixed to the storage container shell and configured to receive the transport container support frame, a storage container inlet disposed at the top of the storage container shell, and a plurality of storage container outlet valves movable between an open position and a closed position.

9 Claims, 11 Drawing Sheets

(56) References Cited

U.S. PATENT DOCUMENTS

| | | | |
|---|---|---|---|
| 8,434,990 B2 * | 5/2013 | Claussen | B65D 88/32 |
| | | | 254/89 R |
| 8,545,148 B2 | 10/2013 | Grentner et al. | |
| 10,676,239 B2 * | 6/2020 | Allegretti | B65D 88/30 |
| 11,059,622 B2 | 7/2021 | Allegretti et al. | |
| 2004/0118725 A1 * | 6/2004 | Shuert | B65D 19/0028 |
| | | | 206/386 |
| 2008/0029546 A1 * | 2/2008 | Schuld | B65D 88/26 |
| | | | 222/488 |
| 2008/0226434 A1 | 9/2008 | Smith et al. | |
| 2014/0270996 A1 * | 9/2014 | Thiele | B65D 90/582 |
| | | | 406/122 |
| 2018/0312321 A1 * | 11/2018 | Wondka | B65D 43/0212 |
| 2019/0127144 A1 * | 5/2019 | Lucas | B65D 90/12 |

\* cited by examiner

SYSTEM FOR TRANSPORT OF DRY BULK MATERIAL

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: None

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to a bulk material transport system and a bulk material transport container.

Bulk materials refer to dry solid substances typically found in powder, granular, or lumpy forms. Most dry bulk materials share the characteristic of being rather small and having an irregular shape. Some common examples include livestock feed, grains for human consumption, sand, gravel, cement, minerals, coal, sugar, salt, and flour. Due to their shared physical characteristics, bulk materials behave as a fluid when flowing.

Bulk materials are not easily transported without the proper containers. Because bulk materials do not come packaged individually or in other small containers, bulk materials are usually transported in closed or sealed containers to prevent spillage and contamination.

Figure 1:
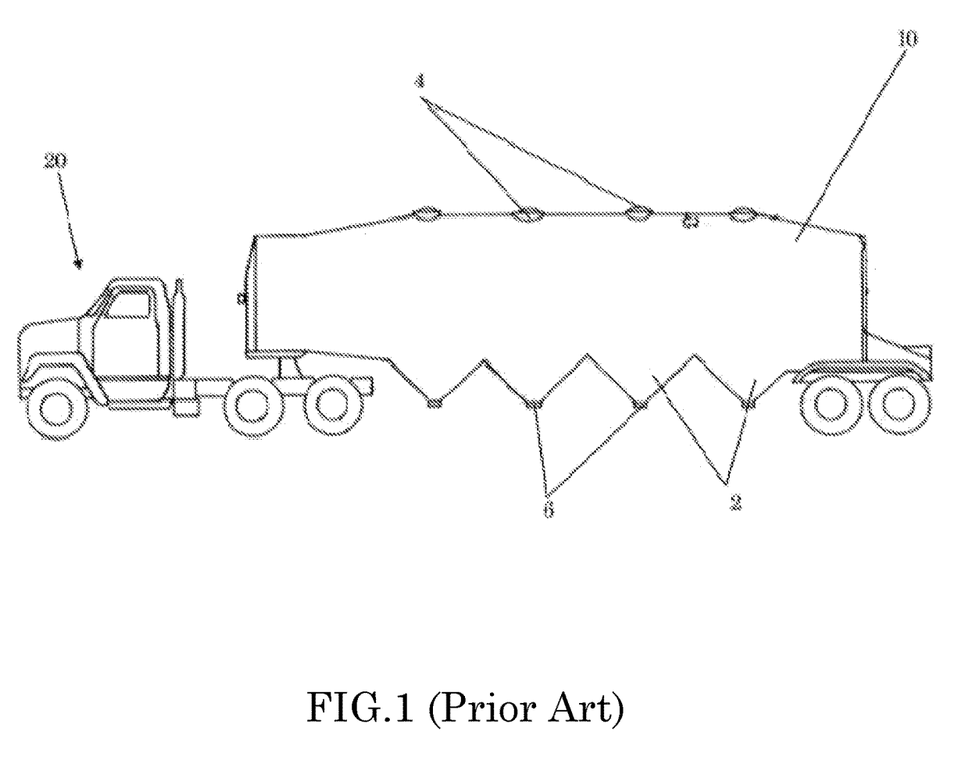
FIG. 1 is a schematic side plan view of a dry bulk trailer of the prior art.

As shown in FIG. 1, bulk materials may be transported by roadway vehicles in dry bulk trailers 10, typically via semi-truck or other large truck vehicles 20. Dry bulk trailers are constructed essentially as metal cylinders with a series of cone-shaped hoppers 2 at the bottom. Dry bulk trailers may include a series of manholes 4 used to load bulk material into the trailer. During the process of unloading the bulk material, an operator of the truck 20 will open a valve 6 present at the bottom of each hopper. Although not shown, a dry bulk trailer may include an on-board vacuum or blower to transport the bulk material along a hose to a silo or other vessel where the product is stored.

Transport of bulk material via dry bulk trailers is a time-consuming process that requires the trailer and attached trucking vehicle to be occupied during the entire time of loading, transporting, and unloading.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

Unless specifically stated otherwise, any part of the apparatus of the present disclosure may be made of any appropriate or suitable material including, but not limited to, metal, alloy, polymer, polymer mixture, wood, composite, or any combination thereof. Dimensions and materials of an exemplary embodiment of certain structures of the apparatus may be described hereinafter.

The Bulk Material Transport System

Figure 2:
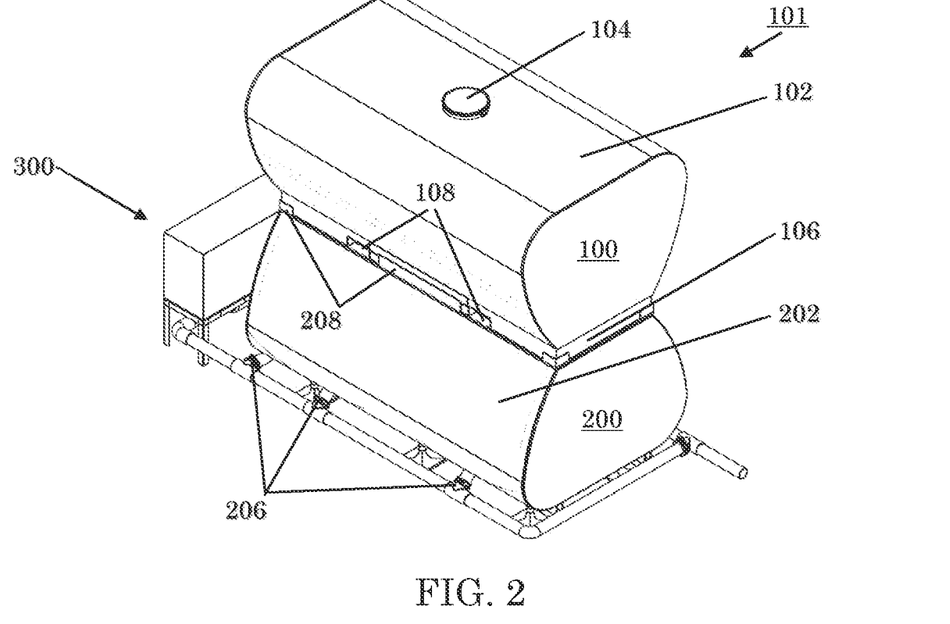
FIG. 2 is a perspective view of a bulk material transport system according to the present disclosure.

FIG. 2 schematically illustrates an embodiment of the bulk material transport system 101 where a transport container 100 is cooperatively engaged with a storage container 200. The bulk material transport system 101 generally includes the transport container 100, the storage container 200, and a pneumatic bulk material outflow system 300.

The transport container 100 generally includes a transport container shell 102 and a bulk material inlet 104 at the top of the transport container shell 102 allowing for the inflow of bulk material into the interior of the transport container 100. The transport container also includes a support frame 106 fixed to the underside of the transport container shell 102.

The support frame 106 may include various lifting means, for example horizontal channels 108 for receiving and slideably enclosing forks of a forklift, enabling the transport container to be moved between a transport vehicle and the storage container 200 or another location where the transport container 100 may act as a temporary storage container.

Figure 3:
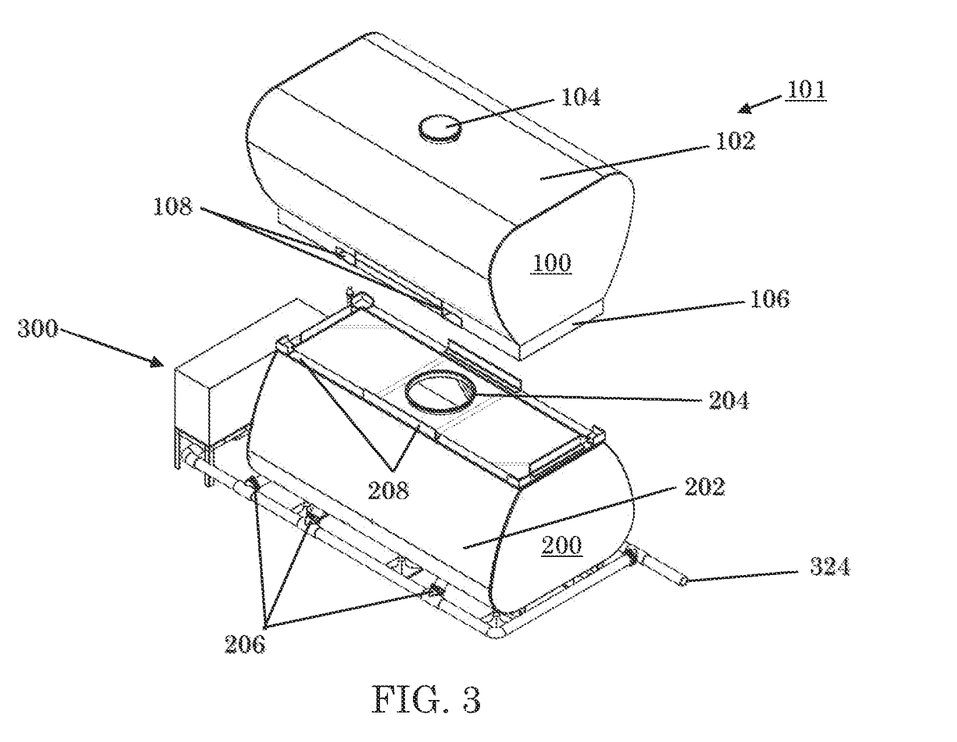
FIG. 3 is an exploded view of the bulk material transport system of FIG. 2.

FIG. 3 schematically illustrates an exploded schematic bulk material transport system 101 where the transport container 100 is disengaged from the storage container 200.

The storage container 200 generally includes a storage container shell 202, a storage container inlet 204 disposed at the top surface of the storage container shell 202, a receiving frame 208 fixed to the topside of the storage container shell 202, and a plurality of storage container outlet valves 206 disposed at a lower portion of the storage container shell 202.

Figure 4:
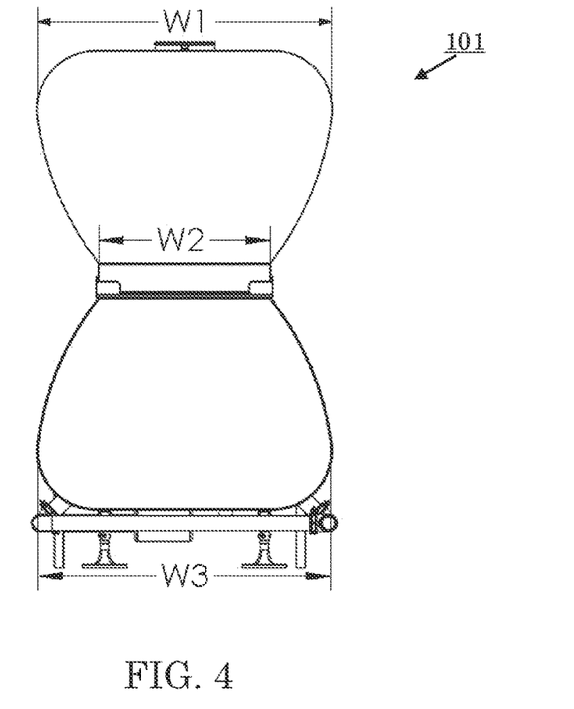
FIG. 4 is an end view of the bulk material transport system of FIG. 2.

As shown in FIG. 4, a width dimension of the transport container 100 narrows from top-to-bottom (from W1-to-W2) and a width dimension of the storage container 200 widens from top-to-bottom (from W2-to-W3) such that when the transport container 100 is cooperatively engaged with the storage container 200, the two form a generally hourglass shaped cross-section. As used herein, an hourglass shaped cross-section, or an hourglass shape in the width cross-section, may refer to a shape that starts with a first width W1 on a first end, decreases in width while moving away from the first end until reaching a minimum width W2 between the first end and a second end, and increasing in width while moving from the minimum width in the middle towards a second width W3 at the second end. That is, the shape may have a middle region that is narrower in width than the widths of the opposing ends.

The pneumatic bulk material outflow system 300 is in fluid communication with the storage container outlet valves 206 and is configured to transport the bulk material in an outflow away from the storage container 200 to a designated location (not shown) where the bulk material will be utilized in various manufacturing processes or stored in a secondary location.

The Pneumatic Bulk Material Outflow System

Figure 5:
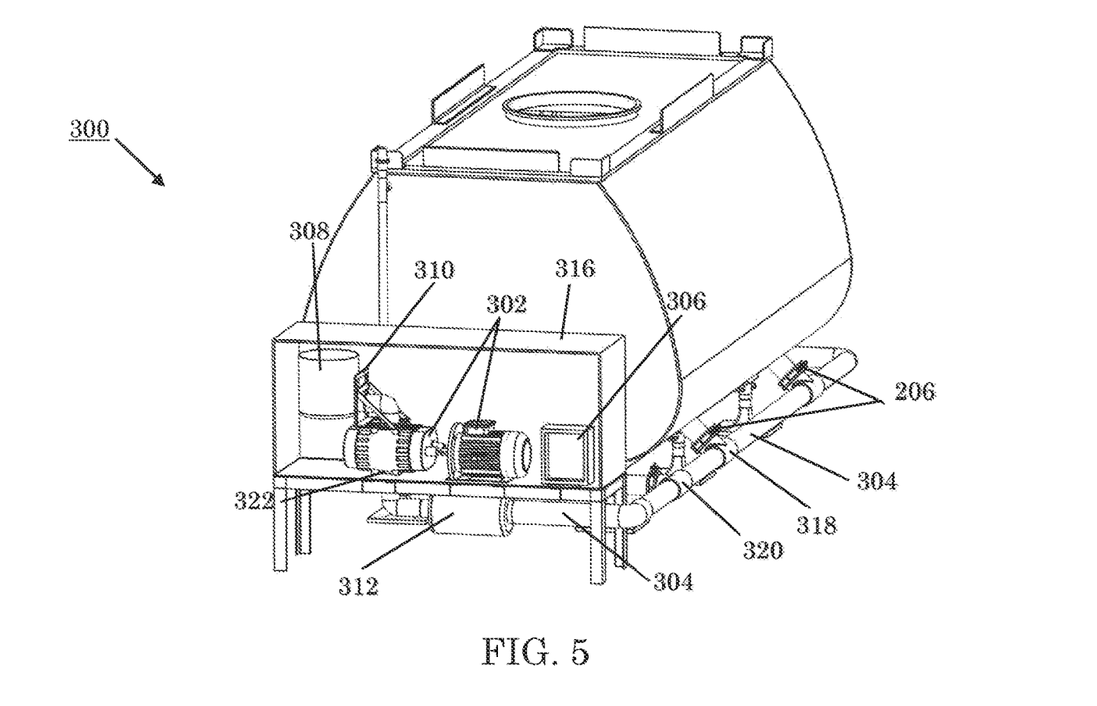
FIG. 5 is a perspective view of a pneumatic bulk material outflow system.

FIG. 5 schematically illustrates an embodiment of the pneumatic bulk material outflow system 300.

The pneumatic bulk material outflow system 300 generally includes a pneumatic source 302, for example, an electric blower configured to create a positive pressure, configured to drive an outflow of the bulk material from the storage container 200, a conduit system 304 connected to the pneumatic source 302 and the storage container outlet valves 206, and a controller 306 operatively associated with the pneumatic source 302.

The pneumatic bulk material outflow system 300 also includes a filter carrier 308 fluidly connected to an air intake of the pneumatic source 302, a silencing bracket 310 disposed between filter carrier 308 and the pneumatic source 302, and a pneumatic muffler (silencer) 312 fluidly connected to an air exhaust of the pneumatic source 302. The filter carrier 308 is configured to provide clean air into the pneumatic source 302 so as to minimize any contamination of the bulk material. All components of the pneumatic bulk material outflow system except for the conduit system 304 may be housed within a weather cover 316 to protect the components from the elements and provide a central location for a user to operate the material outflow system 300 through the controller 306.

The conduit system 304 provides fluid communication channels among each outlet valve 206, the pneumatic source 302, and a designated location where the bulk material will be utilized in various manufacturing processes or stored in a secondary location. The conduit system 304 includes three-way T-shaped junctions 318 disposed at each storage container outlet valve 206 and may also include a T-shaped junction 320 on each lateral side of the storage container 200 to form an interconnected conduit system 304 with a single inlet 322 at the pneumatic source 302 and a single outlet 324 where bulk material is transported away from the storage container.

The controller 306 is configured to generate a control signal to control the operation of the pneumatic source 302. The controller may also be operably associated with the storage container outlet valves 206 and may be configured to generate a control signal to control the position of the storage container outlet valves 206.

As schematically illustrated in FIG. 5, the pneumatic bulk material outflow system 300 includes a controller 306. The controller 306 for example may be in a control module, for example a control panel affixed within the weather cover 316.

Figure 6:
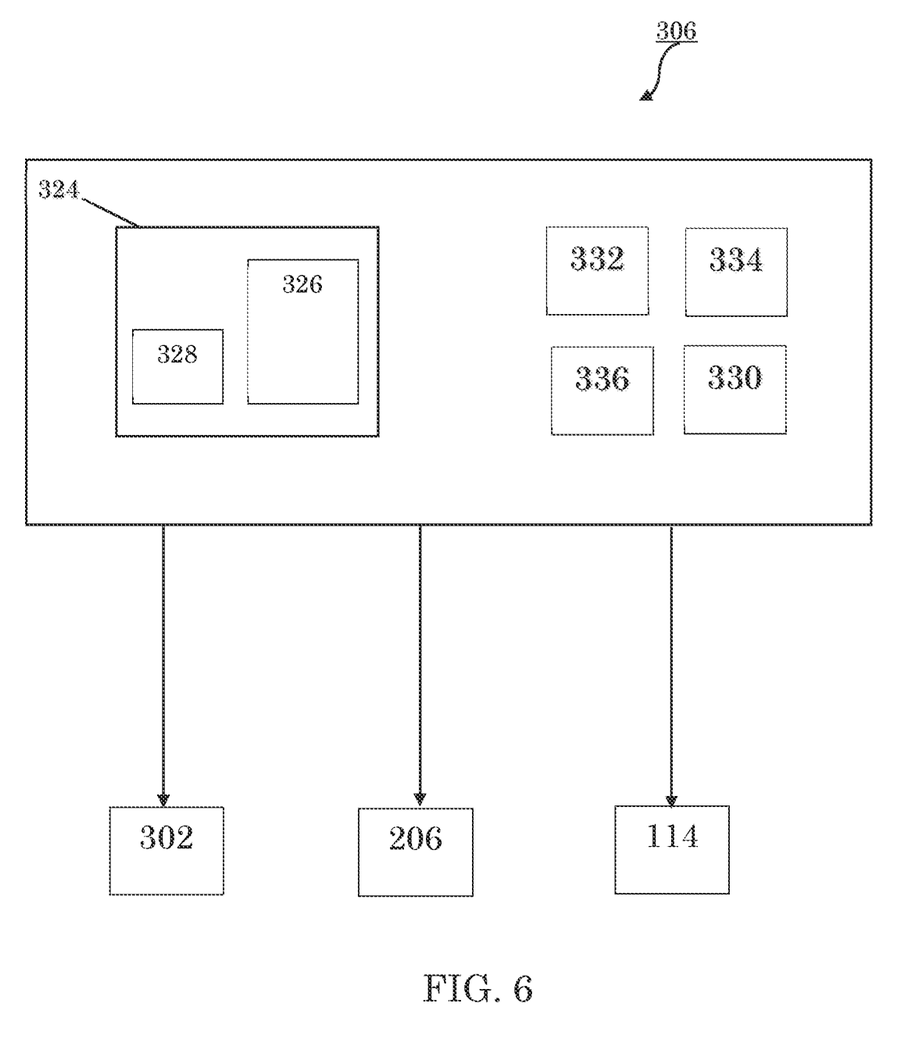
FIG. 6 is a schematic illustration of the controller of the pneumatic bulk material outflow system.

The controller 306 will generate control signals for controlling the operation of the pneumatic source 302 and various valves discussed above, which control signals are indicated schematically in FIG. 6 by lines connecting the controller 306 to the pneumatic source 302 and various valves with the arrow indicating the flow of the command signal from the controller 306 to the pneumatic source 302 and various valves 114, 206 and pneumatic source 302. It will be understood that for control of a valve the controller 306 will send an electrical signal to an electro/mechanical actuator which controls the position of the valve.

Controller 306 includes or may be associated with a processor 332, a computer readable medium 334, a data base 336 and an input/output module or control panel 324 having a display 326. An input/output device 328, such as a keyboard, joystick or other user interface, is provided so that the human operator may input instructions to the controller. It is understood that the controller 306 described herein may be a single controller having all of the described functionality, or it may include multiple controllers wherein the described functionality is distributed among the multiple controllers.

Various operations, steps or algorithms as described in connection with the controller 306 can be embodied directly in hardware, in a computer program product 330 such as a software module executed by the processor 332, or in a combination of the two. The computer program product 330 can reside in RAM memory, flash memory, ROM memory, EPROM memory, EEPROM memory, registers, hard disk, a removable disk, or any other form of computer-readable medium 334 known in the art. An exemplary computer-readable medium 334 can be coupled to the processor 332 such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The Transport Container

Figure 7:
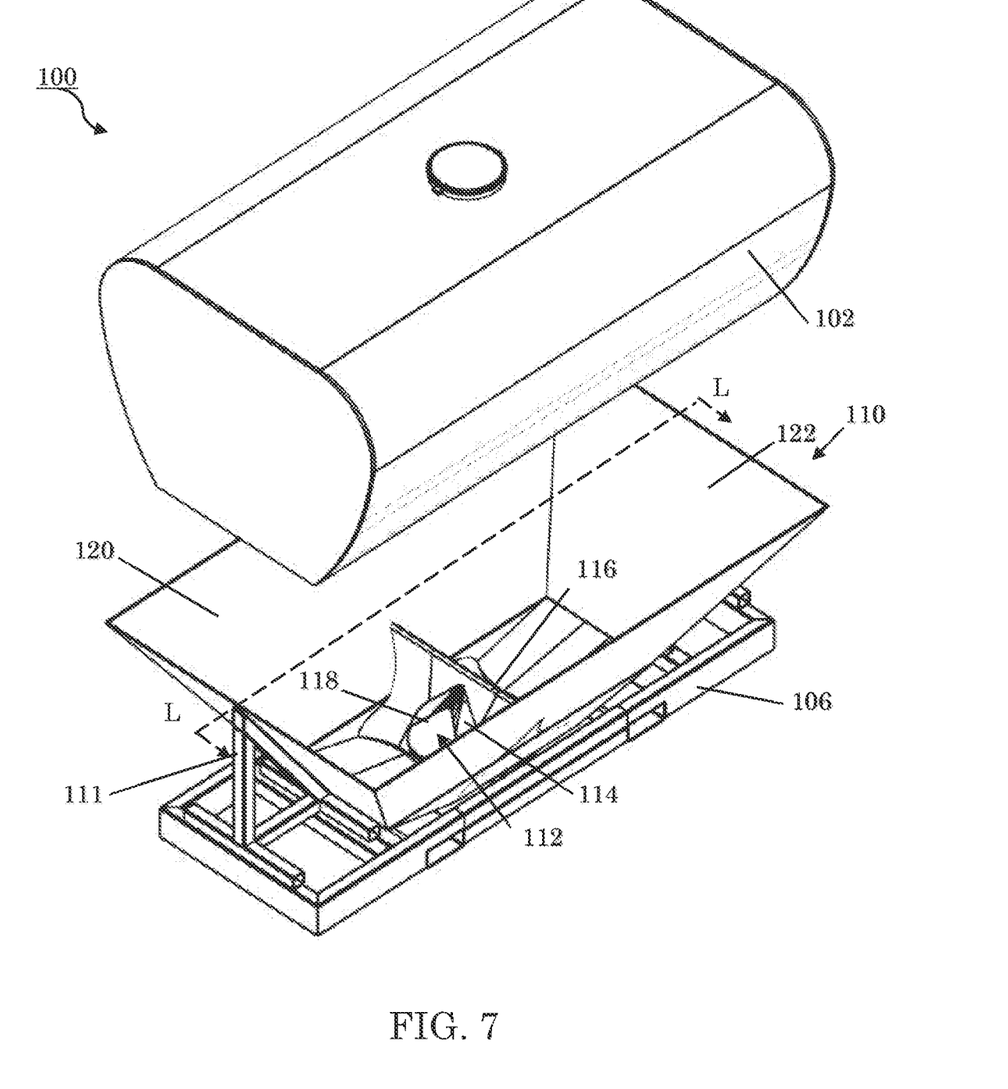
FIG. 7 is an exploded perspective view of a transport container.

As shown in FIG. 7, the transport container 100 further includes a tray bottom 110, an interior tray bottom support frame 111, an outlet 112, and a transport container outlet valve 114 disposed between the tray bottom 110 and the outlet 112. The tray bottom 110 includes a tray divider 116 positioned above the outlet 112 and projects up from a bottom of the tray bottom 110 to segment a lower portion of the tray bottom and direct the flow of bulk material as it exits the transport container. The tray divider 116 is formed by opposing inclined surfaces 117, 119 extending across an interior width of the tray bottom 110 and forms a generally triangular prism.

Figure 9:
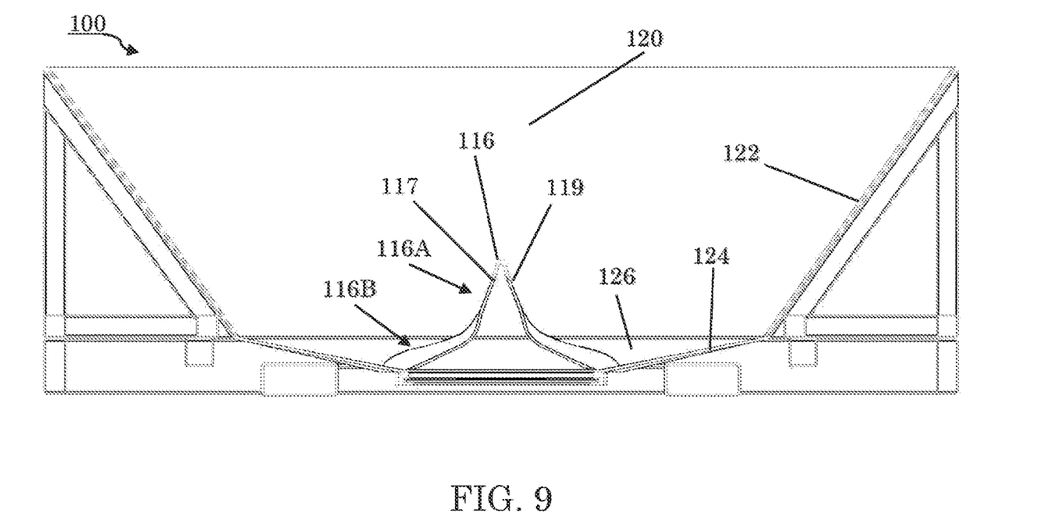
FIG. 9 is a lengthwise sectional view of the transport container of FIG. 7 along section line L-L.

As shown in FIG. 9 and discussed below, the tray divider 116 may include a flared base such that a top portion 116A of the tray divider is formed at a slope is greater than the slope at a bottom portion 116B. The lateral edges of the top portion 116A may be attached at a tray bottom side wall 120 and the lateral edges of the bottom portion 116B may be attached to a tray bottom bottom side wall 126 further discussed below.

The attachments of portion 116A to side wall 120 as well as portion 116B to bottom side wall 126 create channels that divert flow of material to aperture 118. The design of tray divider 116 breaks up compacted fine material at the peak and top portion 116A, while bottom portion 116B reinforces the center and walls of tray bottom 100 and conical valve body 114.

The design of conical valve body 128 in combination with tray divider 116 redistributes weight of material to minimize direct pressure on aperture 118 and the lower conical valve body 134 when the valve is in the closed position and prevent malfunction during opening and closing of the valve. The design also allows the pressure of dry bulk material to push down on upper conical valve body 128 and create a seal against lower conical valve body 134 when the valve 114 is in the closed position.

Figure 8:
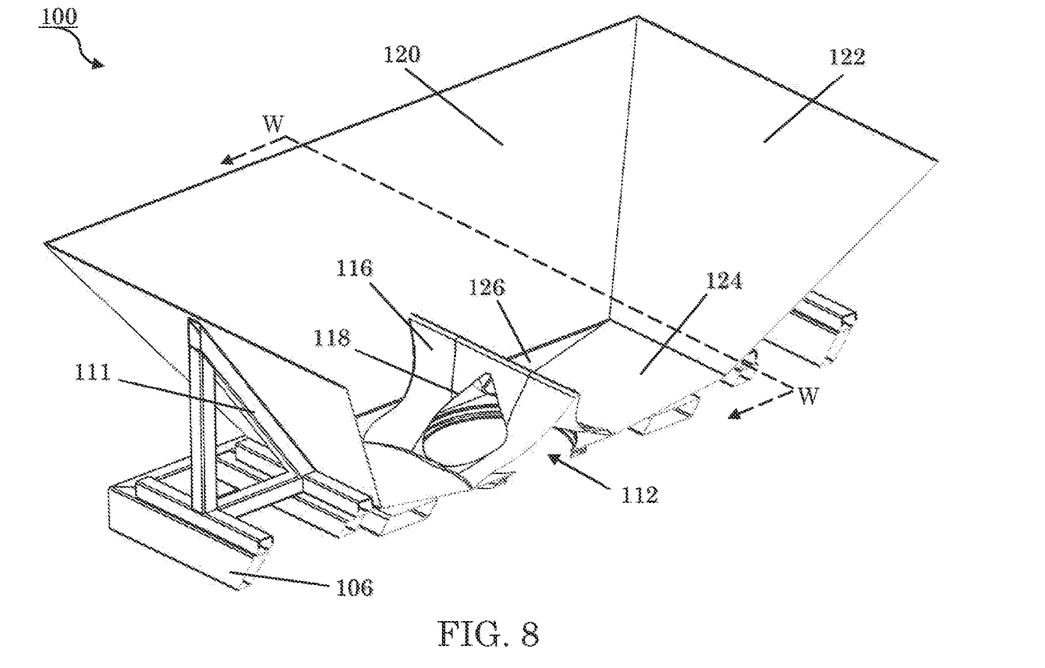
FIG. 8 is a perspective sectional view of the bottom portion of the transport container.
Figure 10:
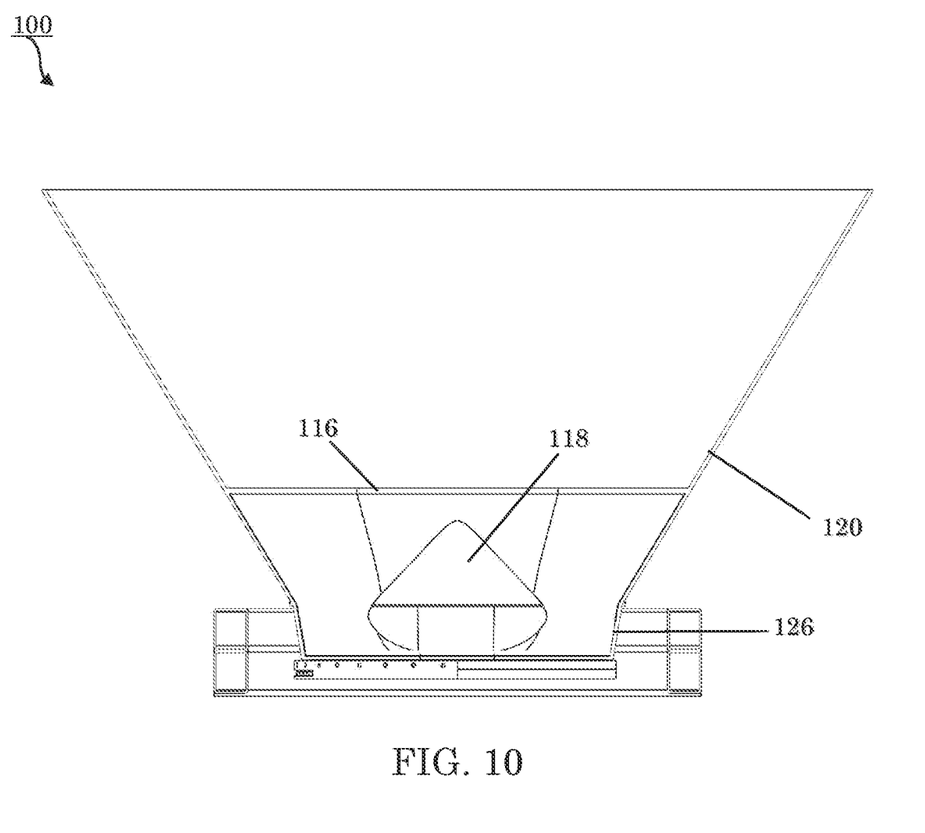
FIG. 10 is a sectional view of the transport container of FIG. 8 along section line W-W.

The tray divider 116 includes at least one aperture 118 disposed on the inclined surface to allow flow of bulk material from the interior of the tray bottom 110 to the outlet 112. The aperture 118 may be sized and shaped similar to an upper conical valve body 128a, 128b as discussed in detail below. The aperture 118 of the tray divider 116 as shown in FIGS. 7, 8, and 10 includes opposing inclined edges that meet at a rounded vertex and a third rounded bottom edge. As shown in FIGS. 9 and 10, the opposing inclined edges are substantially formed at the top portion 116A, and the rounded bottom edge is formed at the bottom portion 116B. The tray divider 116 may have one aperture 118 on each opposing inclined surface. The tray divider 116 may also include more than one aperture 118 on one or both of the opposing inclined surfaces.

The outlet valve 114 illustrated in FIG. 7 is rotated to the open position, allowing flow of bulk material through an aperture 118 of the tray divider 116 and through the valve 114 to the outlet 112. Details of the valve are discussed in detail below.

FIG. 8 illustrates a perspective sectional view of a bottom portion of the transport container. One sidewall and the transport container shell have been removed for ease of understanding. FIG. 9 illustrates a lengthwise sectional view along section line L-L of the transport container 100, and FIG. 10 illustrates a widthwise sectional view along section line W-W of the transport container 100. Portions of the transport container shell 102 have been removed for ease of understanding. The tray bottom 110 includes sidewalls 120 sloping laterally inward and end walls 122 sloping longitudinally inward such that the sidewalls 120 and end walls 122 form a vertical taper at a slope. The tray bottom 110 also includes bottom walls 124, 126 positioned below the sidewalls 120 and end walls 122. In the embodiment shown in FIG. 8, the bottom walls 124, 126 include a pair of bottom end walls 124 sloping longitudinally toward the tray divider 116 and an additional pair of bottom sidewalls 126 sloping laterally inward toward the outlet 112.

As shown in FIGS. 9 and 10, the bottom end walls 124 have a slope that is relatively less than the slope of the end walls 122 with respect to a horizontal, and the bottom sidewalls 126 have a slope that is relatively greater than the slope of the sidewalls 120 with respect to a horizontal. In alternative embodiments, the slope of the bottom end walls 124 may be the same as or greater than the slope of the end walls 122. In alternative embodiments, the slope of the bottom sidewalls 126 may be the same as or less than the slope of the sidewalls 120.

The transport container 100 may include more than one tray divider 116, outlet 112, and outlet valve 114 to accommodate larger loads of bulk material. In transport container including more than one tray divider 116, outlet 112, and outlet valve 114, the transport container will also include additional bottom sidewalls 126 and bottom end walls 124, disposed between each tray divider 116 to direct the flow of bulk material toward the outlet 112.

The Rotatable Sleeve Valve

Figure 11:
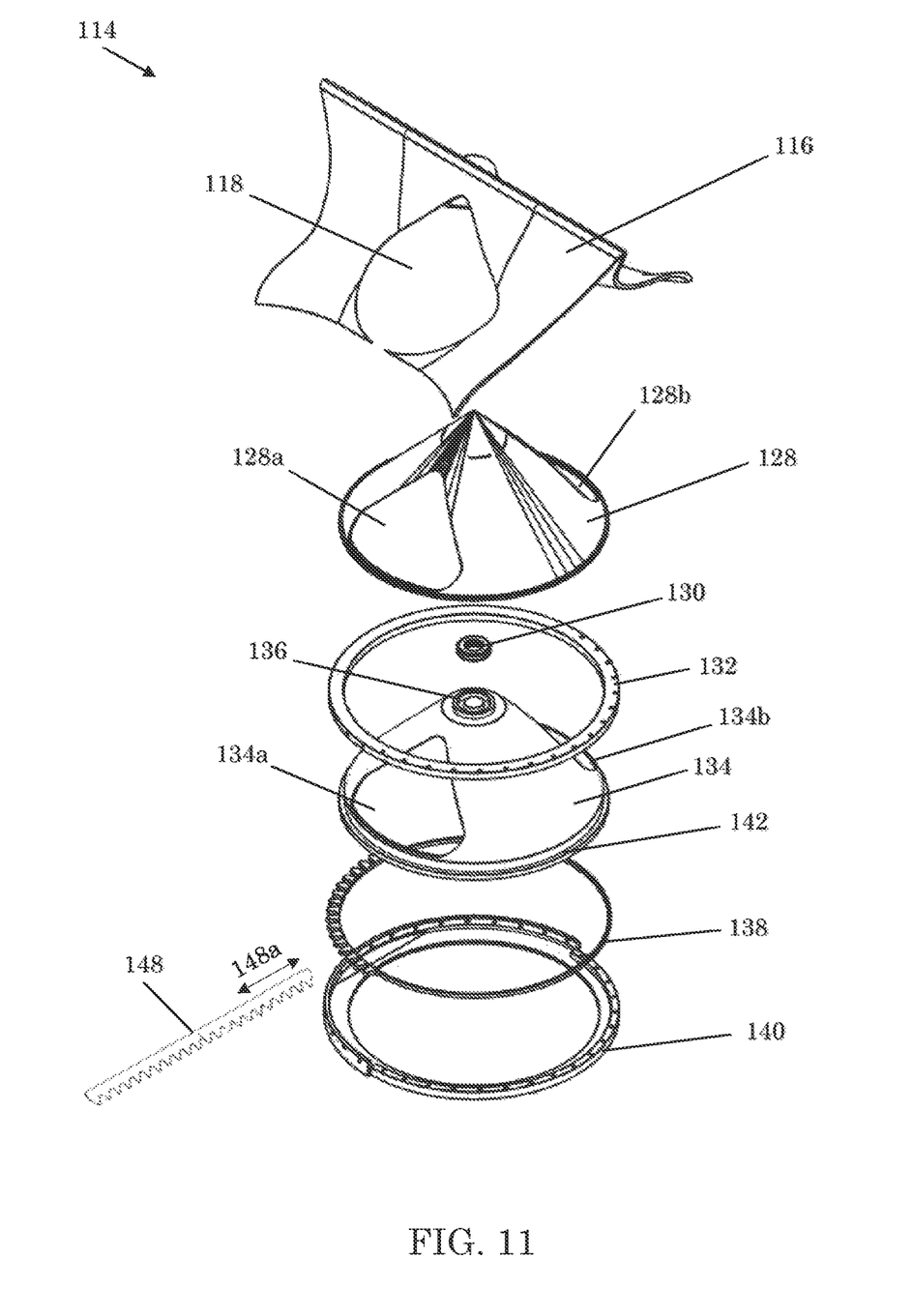
FIG. 11 is an exploded view of a transport container outlet valve.
Figure 12:
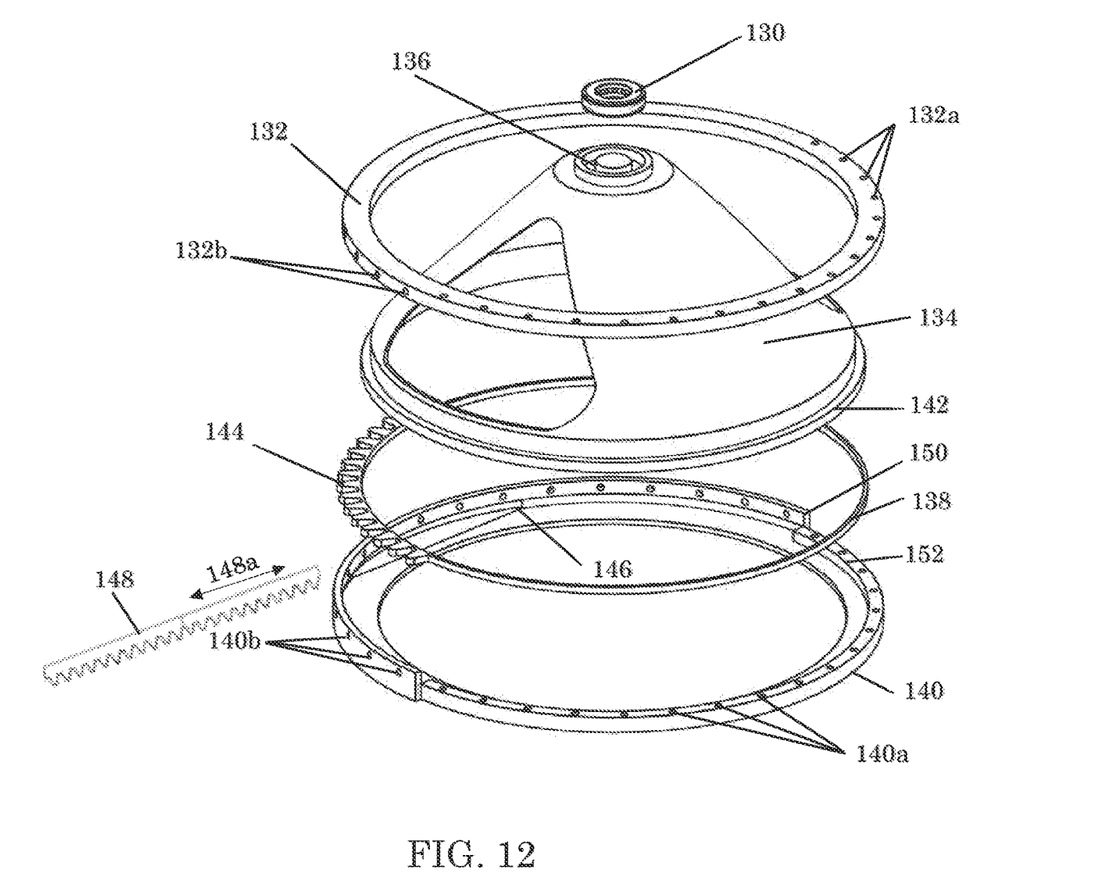
FIG. 12 is an enlarged exploded view of the transport container outlet valve of FIG. 13.

FIG. 11 illustrates an exploded view of the transportation container outlet valve 114, and FIG. 12 illustrates an enlarged exploded view of the same outlet valve 114. The valve 114 of the transport container includes an upper conical valve body 128, a tapered roller thrust bearing 130, a lower conical valve body 134, a circular holding bracket 132, a ring gear 138, and a circular mounting bracket 140. The upper conical valve body 128 and the lower conical valve body 134 each include at least one aperture 128a, 134a, respectively. The lower conical valve body 134 is rotatable with respect to the upper conical valve body 128, allowing the apertures 128a, 134a of the upper and lower conical valve bodies to align when the valve is in the open position. In the closed position, the lower valve body 134 is rotated such that the lower conical valve body aperture 134a is not aligned with the aperture 128a of the upper conical valve body 128.

In the valve body illustrated in FIG. 11, each conical valve body includes two apertures, apertures 128a, 128b of the upper conical valve body 128, and apertures 134a, 134b of the lower conical valve body 134. The apertures of each valve body are disposed on opposing inclined surfaces of the conical valve body as shown in FIG. 11.

The conical valve body apertures may be of any desired shape and size, including any substantially polygonal shape. The aperture may include a plurality of sides and rounded or chamfered corners. In the embodiment illustrated in FIG. 11-12, the apertures include three sides with rounded corners between each side. These apertures are positioned such that a lowest side is substantially parallel with the base of the conical valve body and such that one rounded corner is oriented towards an apex of the conical valve body. As used herein, substantially parallel includes up to about ±10° from true parallel.

The design of the conical valve body apertures allows maximum weight distribution of gravity-fed material towards the wider bottom, facilitating a greater area of flow for material to transfer freely and completely to ensure full delivery of material. The wide bottom of the conical valve body apertures is the destination that the overall design of each component of the transport box is directing material towards.

Aesthetically, the two openings may create an abstract hourglass when viewed from above or below.

The lower conical valve body 134 is nested under and within the upper conical valve body 128, thus giving the valve 114 a sleeve valve configuration. The tapered roller thrust bearing 130 is disposed within a bearing seat 136 on the top of the lower conical vale body 134 and is also between the upper and lower conical valve body. The combination of the upper conical valve body 128, the tapered roller thrust bearing 130, and the lower conical valve body 134 allows for the rotation of the lower conical valve body 134 with respect to the upper conical valve body 128, thus providing a rotatable sleeve valve configuration.

As shown in FIG. 12, the rotating opening mechanism of the valve 114 includes the circular holding bracket 132, a ring gear 138, a circular mounting bracket 140, and a flange 142 of the lower conical valve body 134. The ring gear 138 and the flange 142 are disposed vertically between the circular holding bracket 132 and the circular mounting bracket 140. The ring hear 138 may be welded or otherwise fixed to the flange 142 of the lower conical valve body 134. In operation, the ring gear 138 and the flange 142 of the lower conical valve body 134 are clamped together between the circular holding bracket 132 and the circular mounting bracket 140.

The circular holding bracket 132 includes a plurality of vertical fastening holes 132a and a plurality of horizontal fastening holes 132b. The circular mounting bracket 140 similarly contains a plurality of vertical fastening holes 140a and a plurality of horizontal fastening holes 140b. A screw, bolt, or other suitable rod (not shown) is adapted to be inserted through the horizontal fastening holes 132b of the circular holding bracket 132 and the horizontal fastening holes 140b of the circular mounting bracket 140 to fixedly couple the circular holding and mounting brackets. Accordingly, when the ring gear 138 is rotated, the lower valve body 134 rotates with the ring gear.

In the operation of the rotating opening mechanism, the circular mounting bracket 140 further includes an engagement opening 146 extending a portion of the circumference of the mounting bracket 140. The ring gear 138 includes a plurality of cogs 144 extending a portion of the circumference of the ring gear. The cogs 144 are disposed to extend laterally through the engagement opening 146 and are adapted to engage with a rack, corresponding gear, or adapted toothed member 148 to rotate the ring gear 138, and thus the fixed lower conical valve body 134, between the valve open and closed positions. In the rotating opening mechanism illustrated in FIGS. 11 and 12, the toothed member 148 is a rack adapted to translate along a line 148a and engage with cogs 144 to rotate the valve between open and closed positions.

The controller 306 may further be operably associated with the transport container outlet valve 114 and configured to generate a control signal to control the position of the transport container outlet valve 114.

Dimensions of the valve 114 are now described by way of example. The walls of upper conical valve body 128 and the lower conical valve body 134 may be made of ⅜ (0.375) inch aluminum or ⅛ (0.125) inch steel. The material and thickness of the upper and lower conical valve bodies have suitable strength to prevent deformation from possible unwanted foreign materials (e.g. rocks, debris) impacting upon or lodging between the bodies.

The base of the upper conical valve body 128 may have an outer diameter of 35.067 inches and an inner diameter of 34.005 inches regardless of the thickness or material. The thickness/height of the base of the upper conical valve body 128 is equal to or greater than the thickness of tray bottom walls 124, 126 to ensure proper attachment in combining both parts as one during manufacturing.

The base of the lower conical valve body 134 that meets the inner diameter of the base of the upper conical valve body 128 may have an outer diameter of 33.726 inches and a height of 1.375 inches to maintain appropriate distancing between the upper and lower conical valve bodies 128, 134.

The circular holding bracket 132 may have an outer diameter of 37.75 inches and an inner diameter of 34.005 inches, with a height of 1 inch.

The circular mounting bracket 140 may have an outer diameter of 37.75 inches and inner diameter of 32.678 inches, that is ⅜ (0.375) inches thick and a 2.536 inch wide face to match circular holding bracket 132. The circular mounting bracket 140 may also include a vertical facial strap 150 spanning approximately 50% of the outer circumference of the bracket 140. The facial strap 150 may be 2.175 inches tall by 0.543 inches thick. The circular mounting bracket 140 may also include a horizontal block 152 disposed on the other approximate 50% circumference of the bracket 140, disposed on the inner circumference of the bracket 140, and measure about 1.15 inches thick by 1 inch wide.

The bearing seat 136 dimensions are variable and dependent on the variety of different types of tapered roller thrust bearing 130, which is based on customer and manufacturer request and recommendation.

The Storage Container

The storage container 200 is provided to be a stationary container that remains at a particular worksite where bulk material is further utilized or worked upon. For example, worksites may utilize sand or cement storage, gravel storage, or agricultural grain storage.

Figure 13:
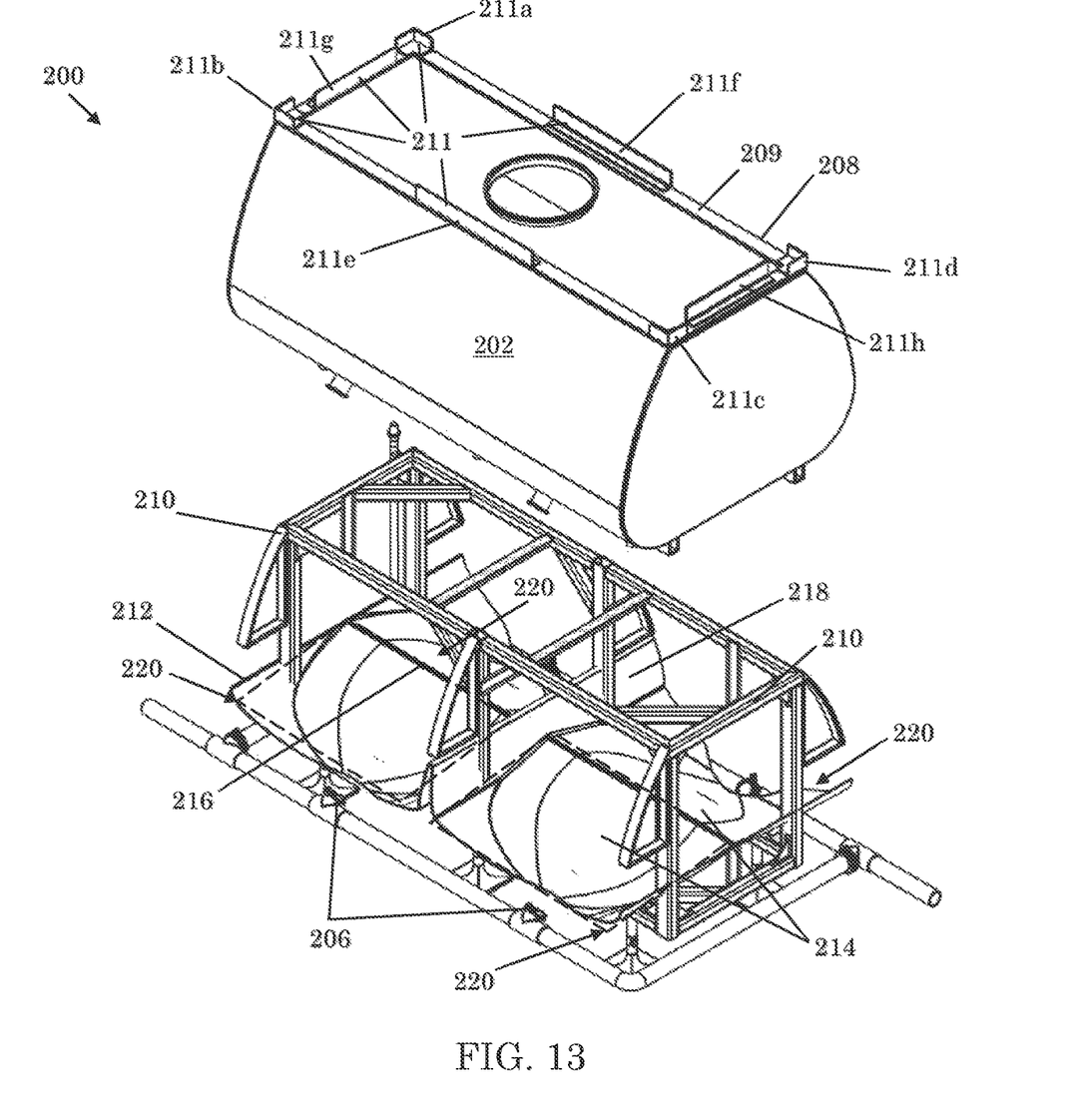
FIG. 13 is an exploded view of a storage container.

The storage container 200 includes a storage container shell 202 configured to provide structure to the storage container and to contain bulk material present in the storage container. FIG. 13 illustrates an exploded view of the storage container 200. The storage container shell 202 is supported by an interior storage container frame 210. As discussed above regarding FIG. 4, the storage container shell 202 includes a width dimension that generally increases from a top width W2 to a bottom width W3 such that the storage container shell has a base that is greater in width than the top when viewed from a width cross-section.

As further shown in FIG. 13, the receiving frame 208 is disposed on a top of the storage container shell 202 and is configured to receive the support frame 106 when the transport container 100 is stacked on top of the storage container 200. The receiving frame 208 generally includes a spacer 209 that extends along a perimeter of the top of the storage container shell, and a plurality of stacking guides 211a-211h, collectively 211, disposed on a top surface of the spacer 209 and configured to facilitate secure stacking and prevent lateral movement of the transport container 100 when cooperatively engaged with the storage container 200. The stacking guides also facilitate the alignment of the transport container outlet 112 with the storage container inlet 204.

The stacking guides may include a plurality of corner diverters 211a-211d one disposed at each corner of the top surface of the storage container shell 202, and a plurality of edge diverters 211e-211h. The edge diverters 211e-211h are interposed between the corner diverters 211a-211d and are generally shaped as an L-shaped bracket. One pair of edge diverters 211e, 211f extending along a length of the spacer 209 may be disposed such that a vertical face of the edge diverter 211e, 211f extends along the outer perimeter of the spacer. Another pair of edge diverters 211g, 211h extending along a width of the spacer 209 may be disposed such that a vertical face of the edge diverter 211g, 211h extends along an inner perimeter of the spacer. Various configurations and orientations of the edge diverters 211g, 211h may be employed to ensure secure stacking of the transport container 100 on the storage container 200.

One or more of the edge diverters may alternatively be formed as an engaged pair of magnetic or electro-magnetic stacking magnets (not shown). The pair may be formed with one magnet disposed on each container and adapted to magnetically engaged with each other when aligned and within a magnetic proximity of each other.

The storage container 200 includes a plurality of storage container outlet valves 206 moveable between an open position and a closed position. The outlet valves 206 may include a pivoted closure member 207, for example a butterfly valve in the closed position as shown in FIG. 16. The outlet valves 206 may also include sliding gate valves, pinch valves, or other valves suitable for application to a particular bulk material present in the storage container.

As shown in FIG. 13, the storage container 200 further includes a storage container tray bottom 212 forming a bottom surface of the storage container and configured to divert bulk material to the outlet valves 206. The storage container tray bottom 212 hereinafter referred to as the storage tray bottom includes a pair of sloped bottom surfaces 214 extending a length of the storage tray bottom 212 and spaced apart from each other. The sloped bottom surfaces 214 are joined at their upper edges, forming a longitudinal ridge 216 and a substantially triangular shape across the width of the storage container.

The storage tray bottom 212 also includes at least one transverse tray divider 218 extending a width of the storage tray bottom 212 and oriented perpendicular to the longitudinal ridge 216. The transverse tray divider 218 projects upwards from the storage tray bottom and above the longitudinal ridge 216 such that the top of the transverse tray divider is above the longitudinal ridge. The transverse tray divider 218 is positioned to be directly beneath the storage container inlet 204 so that bulk material flowing into the storage container first contacts the transverse tray divider and is allocated substantially evenly on both sides of the transverse tray divider.

Figure 14:
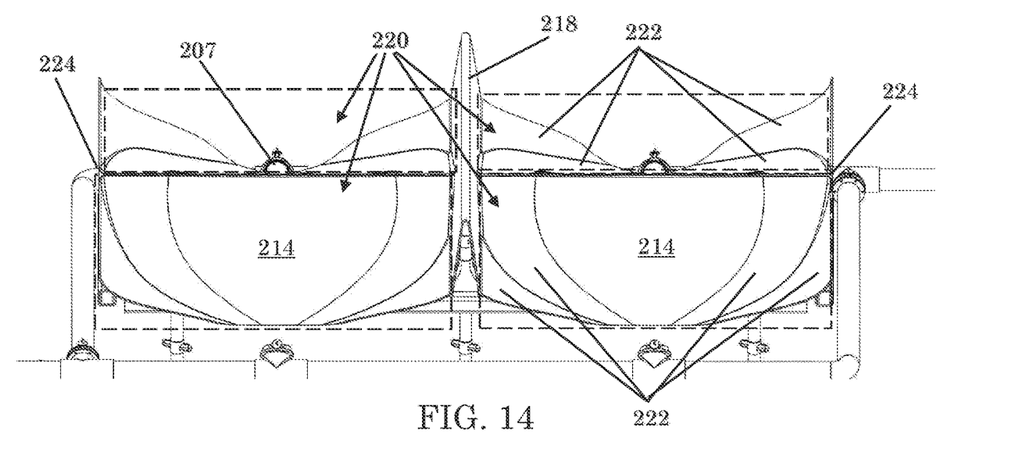
FIG. 14 is a sectional view of a storage container tray bottom.

The longitudinal ridge 216 and the transverse tray divider 218 separate the tray bottom into a plurality of sloping portions 220, for example four sloping portions as shown in FIGS. 13 and 14. Each sloping portion 220 is sloped towards a separate storage container outlet valve 206 so as to direct the flow of bulk material to the outlet valves. As shown in FIG. 14, each sloping portion may also include a plurality of concave portions 222 thereof that are sloped at an angle different from the sloped bottom surface 214. These concave portions 222 may be positioned at sides of the sloping portion adjacent to the transverse tray divider 218 and longitudinal ends 224 of the storage tray bottom 212.

Figure 15:
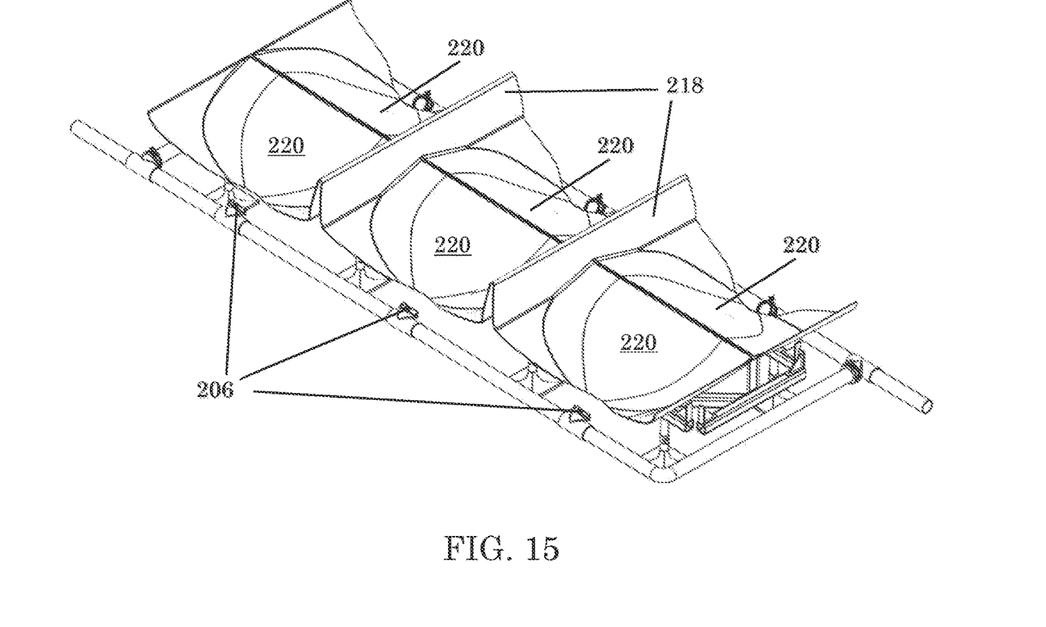
FIG. 15 is an additional embodiment of a storage container tray bottom.

As shown in FIG. 15, the storage container 200 may include more than one transverse tray divider 218. Multiple storage tray dividers 218 along with the longitudinal ridge 216 will separate the tray bottom into a greater number of sloping portions 220, for example six sloping portions as shown in FIG. 15. Each sloping portion 220 is sloped towards a separate storage container outlet valve 206 so as to direct the flow of bulk material to the outlet valves.

In operation, dry bulk material entering the storage container 200 will first be divided substantially evenly on opposing longitudinal sides of the transverse tray divider 218. The bulk material will then contact the longitudinal ridge 216 and be diverted and allocated substantially evenly to the sloping portions 220 separated by the transverse tray divider 218 and longitudinal ridge 216.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A bulk material transport container, comprising:
   an outer shell;
   a tray bottom including a first tray divider with at least one aperture, sidewalls sloping laterally inward, and bottom end walls sloping longitudinally toward the tray divider;
   an outlet, the outlet disposed beneath and aligned with the tray divider; and
   a valve disposed between the tray divider and the outlet, the valve rotatable between an open position and a closed position.

2. The bulk material transport container of claim 1, wherein the valve further comprises:
   an upper conical valve body including at least one aperture;
   a lower conical valve body disposed adjacent the upper conical valve body including at least one aperture; and
   wherein the upper conical valve body and the lower conical valve body are in a nested configuration; and
   wherein the upper conical valve body aperture, the lower conical valve aperture, and tray divider aperture are aligned in the open position, and the upper conical valve body aperture is not aligned with the lower conical valve aperture in the closed position.

3. The bulk material transport container of claim 2, wherein:
   the aperture of the upper conical valve body and the aperture of the lower conical valve body include a plurality of sides with rounded corners between each side; and
   wherein each aperture is disposed such that a lowest side of each aperture is substantially parallel with a base of each valve body.

4. The bulk material transport container of claim 3, wherein:
   the aperture of the upper conical valve body and the aperture of the lower conical valve body include three sides with rounded corners between each side; and
   wherein each aperture is positioned such that one rounded corner is oriented towards an apex of each conical valve body.

5. The bulk material transport container of claim 3, wherein:

the upper conical valve body and the lower conical valve body each include two apertures; and wherein the two apertures of upper conical valve body are disposed on opposing sides of the upper conical valve body; and wherein the two apertures of lower conical valve body are disposed on opposing sides of the lower conical valve body.

6. The bulk material transport container of claim 1, wherein the valve further comprises:
- a circular mounting bracket disposed circumferentially around a base of the lower conical valve body and including an engagement opening, the engagement opening extending a portion of a circumference of the mounting bracket;
- a ring gear fixedly attached to the lower conical valve body and including cogs extending a portion of the circumference of the ring gear;
- a toothed member configured to engage with the cogs; and
- wherein the cogs are disposed to extend through the engagement opening and engage with the toothed member to rotate the lower conical valve body.

7. The bulk material transport container of claim 1, wherein:
- the side walls are sloped at a first angle with respect to a horizontal;
- the bottom end walls are sloped at a second angle with respect to the horizontal;
- wherein the second slope is less than the first slope.

8. The bulk material transport container of claim 1, wherein:
- the tray divider projects upwards from the downwardly sloping bottom; and
- an apex of the tray divider is disposed above an entirety of the downwardly sloping bottom.

9. The bulk material transport container of claim 1, wherein:
- the tray bottom includes a second tray divider spaced apart from the first tray divider and including at least one aperture;
- the tray bottom including bottom end walls disposed between the first and second tray divider and forming a transverse ridge between the first and second tray dividers.

* * * * *